US 9,548,919 B2

(12) United States Patent
Guichard et al.

(10) Patent No.: US 9,548,919 B2
(45) Date of Patent: Jan. 17, 2017

(54) TRANSPARENT NETWORK SERVICE HEADER PATH PROXIES

(71) Applicant: Cisco Technology, Inc., San Jose, CA (US)

(72) Inventors: James Guichard, New Boston, NH (US); Paul Quinn, Wellesley, MA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 14/522,974

(22) Filed: Oct. 24, 2014

(65) Prior Publication Data

US 2016/0119226 A1    Apr. 28, 2016

(51) Int. Cl.
| | | |
|---|---|---|
| H04L 12/28 | (2006.01) | |
| H04L 12/56 | (2006.01) | |
| H04L 12/725 | (2013.01) | |
| H04L 12/701 | (2013.01) | |
| H04L 12/721 | (2013.01) | |
| H04L 12/859 | (2013.01) | |
| H04L 29/06 | (2006.01) | |

(52) U.S. Cl.
CPC ......... *H04L 45/306* (2013.01); *H04L 29/0653* (2013.01); *H04L 45/00* (2013.01); *H04L 45/38* (2013.01); *H04L 47/2475* (2013.01)

(58) Field of Classification Search
CPC .......... H04L 29/06095; H04L 29/0653; H04L 45/74; H04L 49/3009; H04L 49/309
USPC ................................................. 370/392, 389
See application file for complete search history.

(56) References Cited

U.S. PATENT DOCUMENTS

| | | | |
|---|---|---|---|
| 7,558,261 | B2 | 7/2009 | Arregoces et al. |
| 7,571,470 | B2 | 8/2009 | Arregoces et al. |
| 7,610,375 | B2 | 10/2009 | Portolani et al. |
| 7,643,468 | B1 | 1/2010 | Arregoces et al. |
| 7,657,940 | B2 | 2/2010 | Portolani et al. |
| 8,311,045 | B2 | 11/2012 | Quinn et al. |
| 8,442,043 | B2 | 5/2013 | Sharma et al. |
| 9,300,585 | B2 * | 3/2016 | Kumar ................ H04L 45/12 |
| 9,407,540 | B2 * | 8/2016 | Kumar ................ H04L 45/306 |
| 2006/0092950 | A1 | 5/2006 | Arregoces et al. |
| 2006/0095960 | A1 | 5/2006 | Arregoces et al. |
| 2008/0177896 | A1 | 7/2008 | Quinn et al. |

(Continued)

OTHER PUBLICATIONS

U.S. Appl. No. 61/924,085, filed Jan. 6, 2014.*

(Continued)

*Primary Examiner* — Chuong T Ho
(74) *Attorney, Agent, or Firm* — Edell, Shapiro & Finnan, LLC

(57) ABSTRACT

A controller that is in communication with the plurality of network nodes establishes a service path for a service chain defined by an ordered sequence of service functions to be performed at respective ones of one or more of the plurality of network nodes. The controller assigns a predetermined service path identifier and a predetermined service index value for a segment of the service chain that includes only one or more network nodes not capable of decapsulating packets to extract a network service header so as to designate the one or more network nodes determined not capable of decapsulating packets to extract the network service header as a single service hop segment in the service chain.

26 Claims, 6 Drawing Sheets

(56) References Cited

U.S. PATENT DOCUMENTS

| 2010/0165985 | A1 | 7/2010 | Sharma et al. | |
|---|---|---|---|---|
| 2013/0163594 | A1* | 6/2013 | Sharma | H04L 45/64 370/392 |
| 2014/0050223 | A1* | 2/2014 | Foo | H04L 47/2441 370/400 |
| 2015/0071285 | A1* | 3/2015 | Kumar | H04L 45/306 370/392 |
| 2015/0195197 | A1* | 7/2015 | Yong | H04L 45/74 370/392 |
| 2015/0365324 | A1* | 12/2015 | Kumar | H04L 12/4641 370/392 |

OTHER PUBLICATIONS

Joseph, et al., "A Policy-aware Switching Layer for Data Centers," SIGCOMM'08, Aug. 17-22, 2008, Seattle, Washington, USA, pp. 51-62.

Paul, et al., "OpenADN: Mobile Apps on Global Clouds Using OpenFlow and Software Defined Networking," GC'12 Workshop: First International workshop on Management and Security technologies for Cloud Computing 2012, Dec. 2012, 5 pages.

Gurbani, et al., "Session Initiation Protocol (SIP) Overload Control," Internet Engineering Task Force (IETF), SOC Working Group, Internet-Draft, Intended status: Standards Track, May 23, 2013, 35 pages.

Rosenberg, et al., "SIP: Session Initiation Protocol," Internet Engineering Task Force (IETF), Network Working Group, Standards Track, Request for Comments: 3261, Jun. 2002, 269 pages.

Hilt, et al., "Design Considerations for Session Initiation Protocol (SIP) Overload Control," Internet Engineering Task Force (IETF), Informational, Request for Comments: 6357, Aug. 2011, 25 pages.

Cisco, "Cisco Nexus 1000V Series Switches: Deploy Cisco vPath Service-Chaining Architecture," White Paper, retrieved from http://www.cisco.com/c/en/us/products/collateral/switches/nexus-1000v-switch-vmware-vsphere/white_paper_c11-713736.html, on Sep. 16, 2014, pp. 1-4.

Halpern, et al., "Service Function Chaining (SFC) Architecture," Internet Engineering Task Force (IETF), Network Working Group, Internet-Draft, Standards Track, Aug. 22, 2014, pp. 1-26.

Quinn, et al., "Network Service Header," Internet Engineering Task Force (IETF), Network Working Group, Internet-Draft, Standards Track, Jul. 3, 2014, pp. 1-27.

Rosen, et al., "BGP/MPLS IP Virtual Private Networks (VPNs)," Network Working Group, RFC 4364, Feb. 2006, pp. 1-47.

International Search Report and Written Opinion in counterpart International Application No. PCT/US2015/056816, mailed Feb. 4, 2016, 14 pages.

P. Quinn et al., "Network Service Header; draft-quinn-sfc-nsh-02.txt", Network Working Group, Internet-Draft, Feb. 14, 2014, 21 pages.

P. Quinn et al., "Network Service Header; draft-quinn-nsh-00.txt", Network Working Group, Internet-Draft, Jun. 13, 2013, 20 pages.

P. Quinn et al., "Service Function Chaining (SFC) Architecture; draft-quinn-sfc-arch-05.txt", Network Working Group, Internet-Draft, May 5, 2014, 31 pages.

P. Quinn et al., "Service Function Chaining Problem Statement; draft-ieff-sfc-problem-statement-00.txt", Network Working Group, Internet Draft, Jan. 29, 2014, 18 pages.

\* cited by examiner

TRANSPARENT NETWORK SERVICE HEADER PATH PROXIES

TECHNICAL FIELD

The present disclosure relates to networking for service chains/service paths.

BACKGROUND

Service chaining involves the interception of traffic (packets/frames) and steering them through an ordered set of service functions. Traffic is intercepted through the use of a classifier function at a network node for steering through the service functions. Traffic steering the traffic from the classifier through the service functions is performed by use of a service overlay in the network. This service overlay provides a provision for carrying service metadata in addition to the original packet.

The service chain and the corresponding forwarding state is constructed, maintained and distributed by a control-plane (centralized or distributed). Service chain construction involves establishment of a binding between forwarding state and the service chain. This mapping of forwarding-state to the service chain is termed the service path.

DESCRIPTION OF EXAMPLE EMBODIMENTS

Overview

Figure 1:
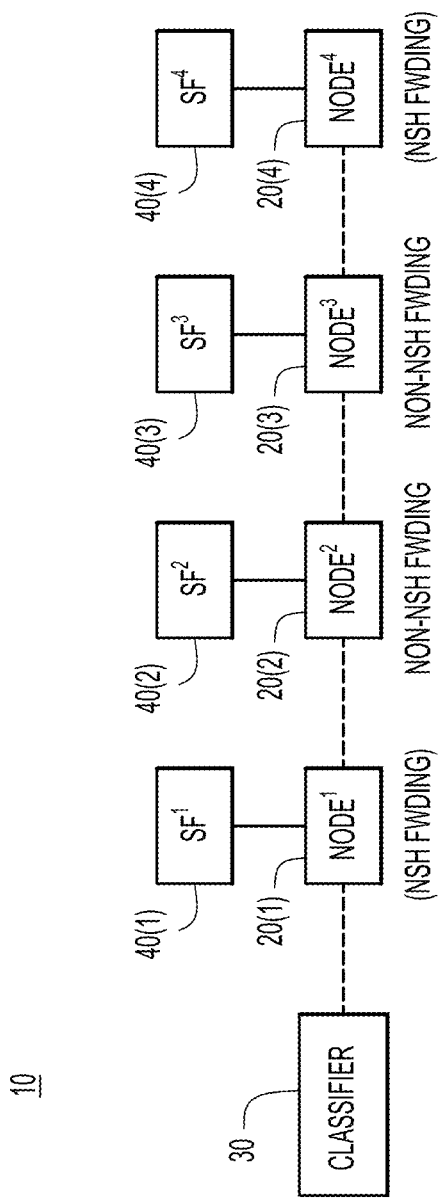
FIG. 1 is a block diagram of a service chain having network nodes of different network service header processing capabilities, according to an example embodiment.

Presented herein are techniques useful in a network comprising a plurality of network nodes each configured to apply one or more service functions to traffic that passes through the respective network nodes. A controller that is in communication with the plurality of network nodes establishes a service path for a service chain defined by an ordered sequence of service functions to be performed at respective ones of one or more of the plurality of network nodes. One or more of the network nodes of the service path are capable of decapsulating packets of traffic to extract a network service header that includes service chain forwarding information instructing how packets are to be forwarded through the service chain and contextual service path information for the service chain forwarding information, and one or more of the network nodes of the service path are not capable of decapsulating packets to extract the network service header. The controller assigns a predetermined service path identifier and a predetermined service index value for a segment of the service chain that includes only one or more network nodes not capable of decapsulating packets to extract the network service header so as to designate the one or more network nodes determined not capable of decapsulating packets to extract the network service header as a single service hop segment in the service chain.

Example Embodiments

A service chain is defined as a set of service functions, e.g., firewall, network address translation (NAT), deep packet inspection (DPI), intrusion detection service (IDS), and the order in which they should be applied to selective packets as they are forwarded through a service-path. This form of service chaining, while useful, does not provide enough functionality for the delivery of more complex services that rely upon the binding of service policy to granular information such as per-subscriber state, or receipt of metadata specifically formatted for consumption by a particular service function. Examples of metadata specifically formatted for consumption by a service function include application identification, flow identifier and user identity. Such advanced services require that service context and metadata be carried within service headers as part of the data-plane encapsulation.

Service nodes utilize information carried within service headers in the data-plane, such as network classification used for deriving targeted service policies and profiles. Service nodes may also determine common metadata related to a particular service such as finer classification that can be passed to the service functions further down the service-path. In other words, services benefit from metadata derived both from the network as well as the service functions that form a given service chain. Metadata can also be passed between network nodes and be used, for example, to determine forwarding state at the end of a service chain.

The metadata imposed by the network node originating the service chain is a combination of the metadata pushed by a central controller and metadata determined by the network node itself. Controllers push network classification specific metadata to all the network nodes that act as classifiers (also referred to as classifier nodes herein). These network nodes perform the classification and choose the assigned metadata for that classification along with the forwarding state. The determined metadata could be related to aspects of the service topology such as tenant identity. The implication of associating such metadata to the forwarding state and passing it to the functions that provide services is that more complex services can be delivered, for instance, on a tenant boundary for a given service-path. This can result in simpler services because the services do not need to derive information or re-classify every packet/flow.

A Network Service Header (NSH) is defined to enable service chaining in the data plane. The NSH provides a service overlay that is independent of the transport encapsulation used for traffic steering, and also metadata capabilities that allow services to exchange information.

Support for NSH-based packet steering involves that participating nodes—network and/or service—consult NSH headers a service path identifier and service index in order to derive the needed network path(s). However, in some cases the participating nodes are unable to support NSH forwarding (e.g., for legacy services important for a customer) or have another mechanism that is used to provide explicit path selection (such as segment routing). Although the NSH does not provide path selection for these deployments, NSH metadata carried within mandatory context headers is still useful.

Presented herein are techniques for non-NSH network segments to participate in NSH-aware service chaining through use of transparent NSH path proxies which are treated as a single hop at the services layer and are defined centrally through a control plane element.

Reference is now made to FIG. 1 for a description of an example network environment in which the techniques presented herein may be employed. In the example of FIG. 1, there is shown a service chain 10 comprising a plurality of network nodes (also referred to as "service nodes" or simply "nodes"), for example four nodes 20(1)-20(4), and a classifier node 30. Each node 20(1)-20(4) performs a service function 40(1)-40(4), respectively. In the figures, nodes 20(1)-20(4) are also labeled $Node^1$-$Node^4$, respectively, and service functions 40(1)-40(4) are also denoted $SF^1$-$SF^4$, respectively. A node may perform multiple service functions, but for simplicity FIG. 1 shows that each node performs a single service function.

Both a service function and a node may be viewed as logical entities. They might be separate boxes (separate physical devices), they might be running on the same box (same physical device). Moreover, they may be physical, virtual (embodied as software running on a compute element), or any combination of physical and virtual. The node is a "forwarding node/process" in that it looks at the NSH and pick the right transport encapsulation to use for network forwarding.

FIG. 1 shows for the service chain $SF^1 \rightarrow SF^2 \rightarrow SF^3 \rightarrow SF^4$, only $Node^1$ and $Node^4$ use NSH for steering. That is, only $Node^1$ and $Node^4$ are "NSH-aware" or "NSH-capable". Nodes 2 and 3 are not NSH-aware and therefore cannot act on any NSH information, nor can they add/remove NSH headers. In this case the service path contains four service functions that need to be applied to the traffic flowing through the service chain, and $Node^2$ and $Node^3$ rely on a transport, such as segment routing, explicit path information.

Using the techniques described within the NSH architecture, when service chain $SF^1 \rightarrow SF^2 \rightarrow SF^3 \rightarrow SF^4$ is instantiated into the network, the control plane allocates a Service Path Identifier (PathID) and Service Index (SI) that will be used by the NSH infrastructure for forwarding at the service plane layer. In this case, as the service chain consists of four service functions, the SI would be set to 5 (reflecting the number of service functions in the service chain plus 1).

In an NSH-aware service chain, the SI is decremented by 1 at each service hop. That is, after each service function within the service chain is applied. When the SI reaches a value of 1, the NSH is removed from the packet and the packet is forwarded using a transport protocol (e.g., Internet Protocol (IP)) forwarding techniques. This presents a problem in the example service chain shown in FIG. 1 because only $Node^1$ and $Node^4$ have this capability. This means that the SI is decremented by $SF^1$ (from 5 to 4). At this point, $Node^1$ cannot send traffic to $Node^2$ since $Node^2$ does not understand the NSH, but $SF^2$ is required in the chain. One option is to send traffic directly to $SF^2$, and in some cases $SF^2$ might be able to "skip" the NSH to perform its local service policy but it cannot forward to $Node^3/SF^3$. $Node^2/SF^2$ does however use explicitly "pathed" transport (e.g., Segment Routing) to reach the next node such that when traffic arrives at $Node^4$, the SI is still set to 4 (as set by $SF^1$) and this will cause the service path to fail as the SI is incorrect (it should have a value set to 2 and not 4) as $SF^4$ is the last service to be applied for the service chain.

To overcome this problem, and to allow non-NSH aware nodes to participate in an NSH-enabled service chain, the notion of a 'Transparent NSH Path Proxy' is introduced. Within the NSH architecture, a transparent NSH path proxy is treated as a single service hop within the service chain. This functionality allows the control plane that is responsible for instantiation of service chains into the network to recognize whether a node involved in the selected service path for the service chain is capable of processing NSH headers. Using this technique the control plane is able to split the service chain into a number of segments and apply the necessary policy/classification rules at the correct network elements so that traffic is able to flow through the service chain unhindered.

Figure 2:
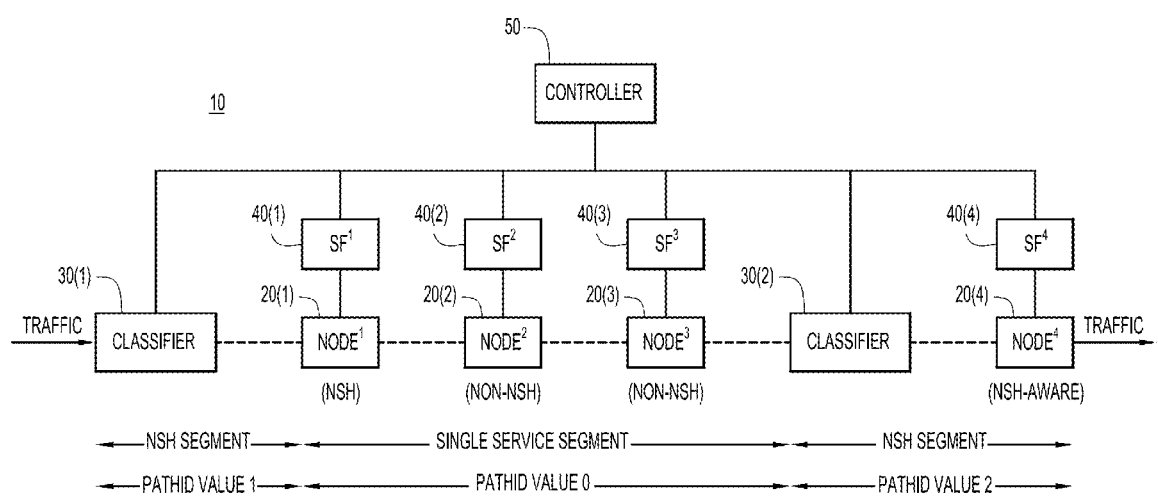
FIG. 2 is a block diagram similar to FIG. 1, and illustrating how a service chain is split into different segments for network nodes having network service header processing capabilities and network nodes not having network service header processing capabilities, according to an example embodiment.

Reference is now made to FIG. 2. FIG. 2 is similar to FIG. 1, but shows that there is a controller 50 and two logical classifier nodes 30(1) and 30(2). The functions of the classifier nodes 30(1) and 30(2) may be performed by dedicated network nodes as shown in FIG. 1, or they may be integrated into existing nodes, such as $Node^4$. The controller 50 is connected to each of the nodes 20(1)-20(4) and to the classifier nodes 30(1) and 30(2). The controller 50 obtains knowledge about the capabilities of the various nodes under its control, and in particular, whether or not a node is capable of processing a NSH. Based on input from a network administrator, the controller 50 establishes a service path for a service chain defined by an ordered sequence of service functions to be performed at respective one or more nodes.

The controller 50 treats each service segment as a separate service path that is bound to a higher layer service chain, as shown in FIG. 2. A reserved service path identifier (PathID) is allocated for non-participant (i.e., non-NSH-aware) segment(s). For example, a PathID (Value0) and a SI of 1 (indicating that the entire segment is one hop) are allocated. Traffic is directed into the service chain PathID "Value 0" by the last NSH-aware node prior to the non NSW-aware segment in accordance with the control plane information supplied by controller 50 to the classifier node 30(1).

At the first service function, $SF^1$, packets arrive with {Path ID "Value 1", SI 2}. This tuple points to $SF^1$ that will apply its function to the traffic and return the traffic to $Node^1$. $Node^1$ sets the tuple {PathID 0, SI 1} (as it is the last NSH-aware node prior to a non-NSH-aware segment) and send the traffic to $Node^2$ which will use the explicit path transport (for example, Segment Routing) to determine that $SF^2$ should be applied (skipping the NSH service path header but passing the metadata to the $SF^2$). $SF^2$ will return the traffic to $Node^2$ which will forward to $Node^3$. Again, $Node^3$ will use the explicit path transport to determine that $SF^3$ should be applied. When traffic returns from $SF^3$, a reclassification event occurs at classifier node 30(2) using the same rules as the classifier node 30(1) for the service chain resulting in an NSH header with {PathID "Value 2", SI 2} being pushed on to the packet and forwarded to $Node^4$. $Node^4$ may now use the NSH information as normal to process the packets as it is an NSH-aware network node. This allocation ensures that NSH values are consistent with the overall service chain environment.

FIG. 2 shows that the controller 50 divides the service chain 10 into several segments. A first segment is between the classifier node 30(1) and $Node^1$, and the PathID for this hop is PathID Value 1. A second segment is from $Node^1$, to Node², Node³ and to the classifier node 30(2). Thus, the non-NSH-aware nodes make up a single service segment, and are assigned a predetermined reserved service path identifier, e.g., PathID Value 0. Thus, even though there are multiple nodes in the non-NSH segment, that segment is treated as a single service hop. The final segment is from classification node 30(2) to NSH-aware Node⁴.

Figure 3:
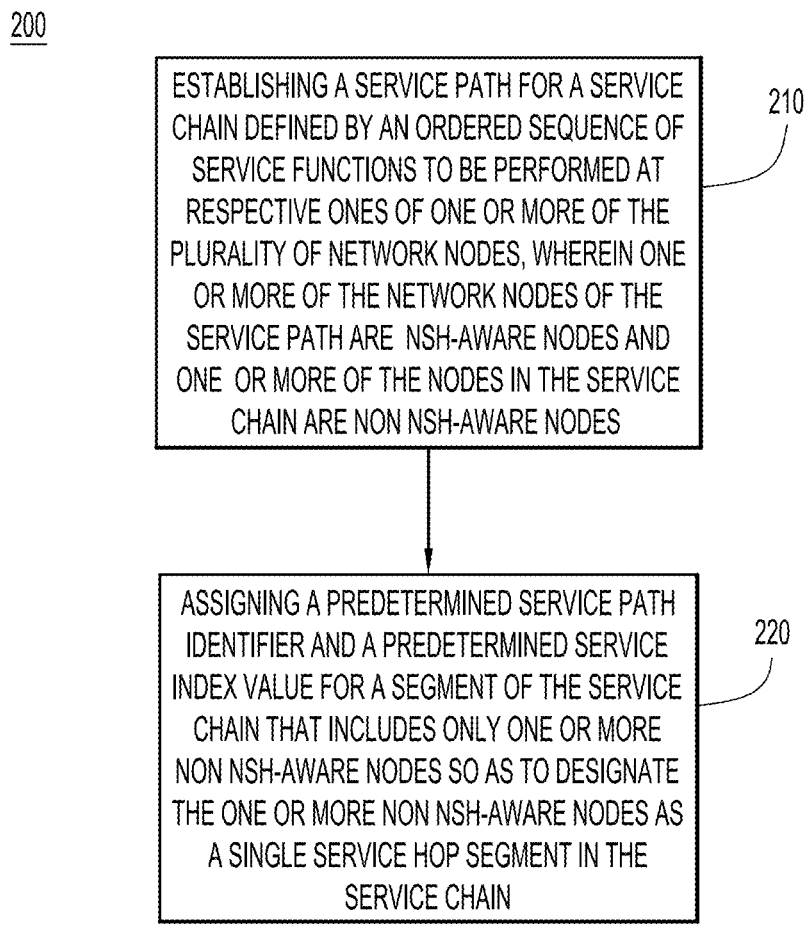
FIG. 3 is a flow chart depicting operations performed at a controller to establish a service chain with network nodes capable of processing the network service header and network nodes not capable of processing the network service header, according to an example embodiment.

FIG. 3 is a flow chart that illustrates operations of a method 200 performed to achieve the techniques depicted in FIG. 2. In this description, "NSH-aware" network nodes are nodes capable of decapsulating packets of traffic to extract a NSH that includes service chain forwarding information instructing how packets are to be forwarded through the service chain and contextual service path information for the service chain forwarding information. Similarly, "non-NSH-aware" network nodes are nodes not capable of decapsulating packets to extract the NSH. At 210, a controller that is in communication with a plurality of network nodes which have one or more service functions associated therewith establishes a service path for a service chain defined by an ordered sequence of service functions to be performed at respective ones of one or more of the plurality of network nodes, wherein one or more of the network nodes of the service path are NSH-aware nodes and one or more of the nodes in the service chain are non-NSH-aware nodes. The controller detects the one or more network nodes that are non-NSH aware. The controller can detect whether a network node is NSH-aware either through direct configuration (i.e., a priori knowledge provided by a network administrator) or by learning from the network nodes through any suitable protocol. The network nodes may be physical network elements (switches, routers, etc.) or virtual network elements (virtual switches, virtual routers, etc.).

At 220, the controller assigns a predetermined service path identifier and a predetermined service index value for a segment of the service chain that includes only one or more non-NSH-aware nodes so as to designate the one or more non-NSH-aware nodes as a single service hop segment in the service chain. The predetermined service path identifier is set to a predetermined reserved value for each segment of the service chain that includes one or more non-NSH-aware nodes. The predetermined service index value may be "1" for each segment of the service chain that includes one or more non-NSH-aware nodes. Conversely, the service index value for each segment of the service chain that includes one or more NSH-aware nodes is dependent on a number of network nodes in the segment.

The controller assigns separate service path identifiers and service index values to each segment of the service chain. Each segment may or may not include one or more network nodes capable of decapsulating packets to extract the NSH. The controller sends to each network node in the service chain the service path identifier and service index value relevant to the corresponding segment of the service chain. In this way, the controller splits the service chain into a plurality of segments including at least one segment of solely NSH-aware nodes and at least one segment of solely non-NSH-aware nodes.

Figure 4:
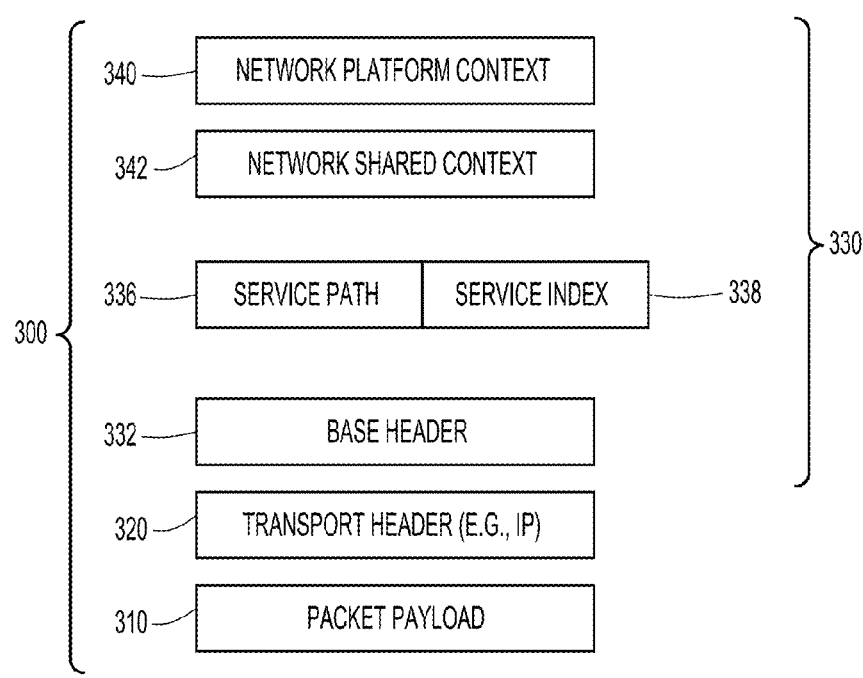
FIG. 4 is a diagram depicting a packet encapsulated in a transport header and network service header, according to an example embodiment.

Reference is now made to FIG. 4. FIG. 4 illustrates an example of a packet that is encapsulated in a transport header (e.g., IP header) and the NSH. The packet, shown at reference numeral 300, includes a packet payload 310, a transport header (e.g., IP or Universal Datagram Protocol (UDP), etc.) and the NSH 330. The NSH 330 includes a base header 332, a service path identifier (PathID) field 336 and a service index field 338. The NSH is designed to be easy to implement across a range of devices, both physical and virtual, including hardware forwarding elements.

The base header 332 includes a field that contains one or more flags. For example, the base header may include a flag that indicates whether a packet is an operations and management (OAM) packet.

The Service Path field 336 identifies a particular service path, and thus contains the aforementioned PathID. A participating node uses this identifier for path selection. The Service Index field 338 contains the aforementioned SI, and indicates how many service functions are in the service path for that PathID.

NSH-aware nodes, e.g., service classifiers, services nodes and forwarding elements in the service plane, have several possible NSH related actions.

Insert/remove service header: these actions can occur at the start and end respectively of a service path or can be performed by a service function that determines that a service path must change due to local policy. Data is classified, and if determined to require servicing, a service header imposed. A service function can re-classify data as required. A service classifier inserts an NSH. As the end of a service chain, the last node operating on the service header removes it.

Forward based on header fields: the NSH provides service chain information and is used by participating nodes to determine correct service path selection and forwarding as well as loop detection. Participating nodes use the NSH for selecting the next service in the service path.

Update a service header: fields in the base service header are updated by service functions. Context headers may be updated as needed, for example if more granular classification occurs. If a non-service element acts as a data plane proxy (adding and removing the NSH on behalf of the service), then that node updates the base header.

Service Policy Selection: service instances derive policy selection from the service header. Context shared in the service header can provide a range of service-relevant information such as traffic classification. Service functions use the NSH to select local service policy.

Once the metadata is added to a packet, an outer encapsulation is used to forward the original packet and the associated metadata to the start of a service chain. The encapsulation serves two purposes:

1. Creates a topologically independent services plane. Packets are forwarded to the required services without changing the underlying network topology.

2. Non-participating network nodes simply forward the encapsulated packets as is.

The NSH is independent of the encapsulation used and may be encapsulated using any transport scheme now known or hereinafter developed. The presence of the NSH is indicated via protocol type in the outer encapsulation.

The NSH may also include one or more context headers, including a Network Platform context header 340, and a Network Shared context header 342. The Network Platform context provides platform-specific metadata shared between network nodes. The Network Shared context header is a network shared context that provides metadata relevant to any network node, such as the result of edge classification.

The metadata passed in the context headers is specific to the forwarding state carried and in that sense, different forwarding paths might carry different metadata. The controller is responsible for managing and pushing service chains to the network nodes that act as classifiers. The service chains and the forwarding path used to realize the service chains determine the service forwarding path or service path. The service path thus becomes the forwarding state that all network nodes have to extract from the context stack in determining the next-hop of the service chain. The network nodes can utilize this forwarding state not only to determine the next-hop for the service chain but also to perform additional transformations on the traffic in accordance with metadata for a particular context header in order to support a variety of service instances, i.e., in order to support a particular service function. As an example, the network nodes can replace the incoming transport with a completely different one that is understood by the service while preserving the context stack. The context headers also enable network nodes to act as proxies to the service functions of another network node and perform mapping of metadata to primitive interfaces understood by the services. Thus, when a network node receives a service header, parses the service header to retrieve the one or more stacked context headers, the network node interprets a forwarding state and a next-hop network node for the service path from the service header, and determines a service action or associated metadata from the set of context headers.

Figure 5:
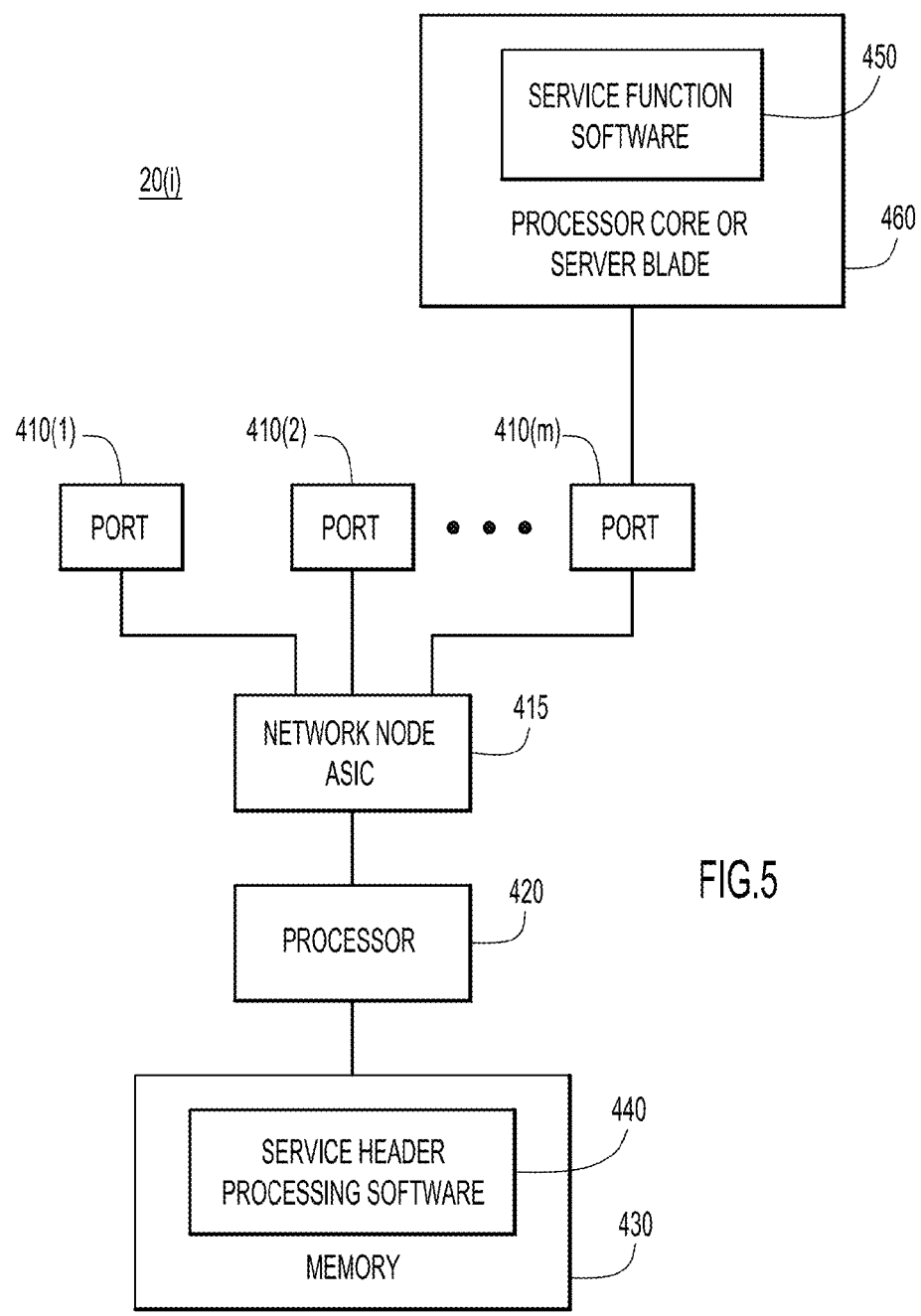
FIG. 5 is an example of a block diagram of a network node, according to an example embodiment.

FIG. 5 illustrates an example block diagram for a network/service node, e.g., a switch, router, gateway, etc., configured to perform the operations described herein for a network node. It should be understood that a virtual network node would be a software-emulated or virtualized version of what is shown in FIG. 5. The network node is shown at reference numeral 20(i) and comprises a plurality of ports 410(1)-410(m), a network Application Specific Integrated Circuit (ASIC) 415, a processor or central processing unit (CPU) 420 and memory 430. The ports 410(1)-410(m) receive ingress packets and output egress packets from the network node. The network node ASIC 420 directs incoming packets to ports for egress according to logic as well as controls from the processor 420. For example, if the network node is a router, then the ASIC 415 is a router ASIC configured for network routing functions, and if the network node is a switch, then the ASIC 415 is a switch ASIC configured for network switch functions. The processor 420 is a microprocessor or microcontroller, for example, and executes instructions for the service header processing firmware/software 440 stored in memory 430. The service header processing firmware/software 440 includes instructions that, when executed by the processor 420, cause the processor to perform the operations described herein for a network node/service node.

The operations of a service function associated with network node 20(i) are implemented by service function software 450 running on a processor core or server blade 460 that is in communication with a port, e.g., port 410(m), of the network node.

The memory 430 may comprise read only memory (ROM), random access memory (RAM), magnetic disk storage media devices, optical storage media devices, flash memory devices, electrical, optical, or other physical/tangible memory storage devices. In general, the memory 430 may comprise one or more tangible (non-transitory) computer readable storage media (e.g., a memory device) encoded with software comprising computer executable instructions and when the software is executed (by the processor 420) it is operable to perform the operations described herein.

Figure 6:
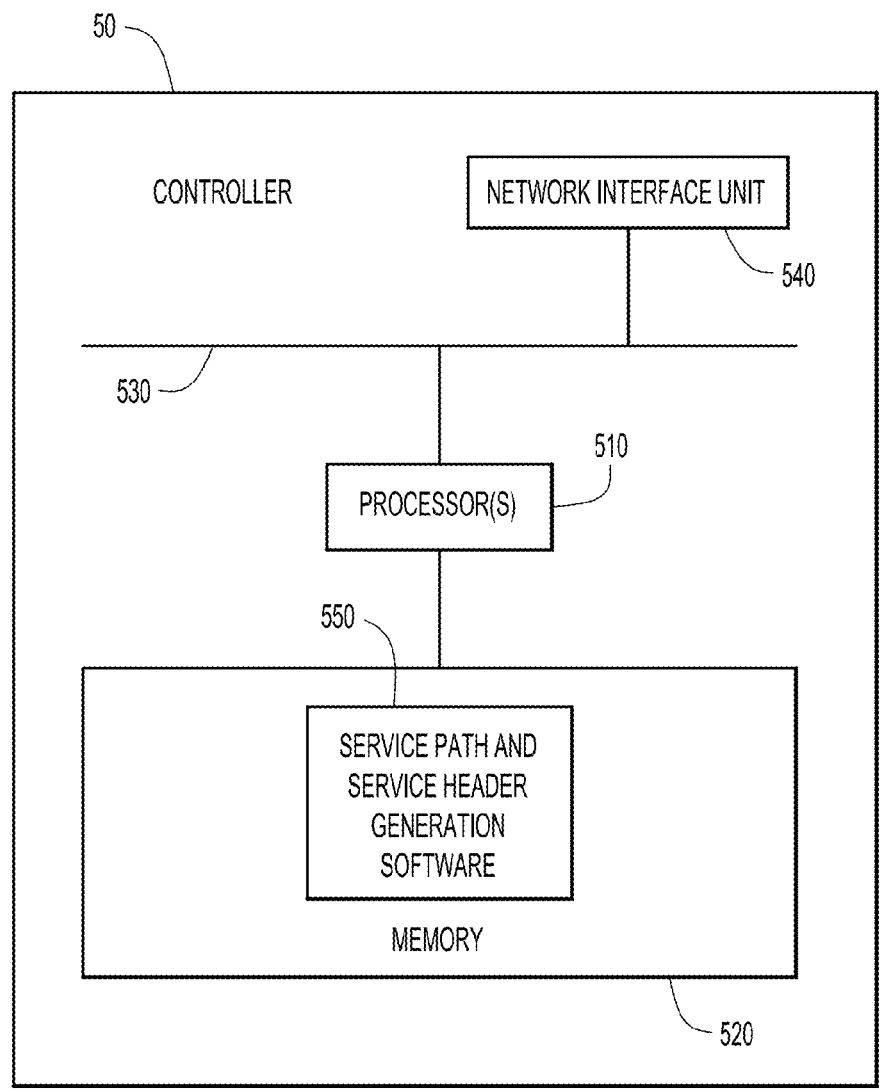
FIG. 6 is an example of a block diagram of a controller that communicates with a plurality of network nodes, according to an example embodiment.

Turning now to FIG. 6, an example block diagram is shown for a controller 50 configured to perform the operations described herein. It should be understood that a virtual controller would be a software-emulated or virtualized version of what is shown in FIG. 7, such as software running in a data center. The controller 50 includes one or more processors 510, memory 520, a bus 530 and a network interface unit 540. The processor 510 may be a microprocessor or microcontroller. The network interface unit 540 facilitates network communications between the controller 50 and the network nodes. The processor 510 executes instructions associated with software stored in memory 520. Specifically, the processor 510 stores service path and service header generation software 550 that, when executed by the processor 510, causes the processor 510 to perform the operations for the controller described herein with respect to FIGS. 1-3.

The memory 520 may comprise ROM, RAM, magnetic disk storage media devices, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the operations described herein.

In summary, techniques are presented that provide for the ability for non-NSH aware nodes to be integrated into an NSH-aware service chain and use the metadata capabilities of the NSH architecture. This allows for rapid deployment of service chains, particularly where there are service functions that would like to take advantage of the metadata capabilities of NSH immediately and move over time to support a full NSH implementation. In so doing, these techniques enable mixed environments of NSH-aware and NSH-unaware service nodes. The use of different transports for NSH is generalized such that the transport can participate in the services topology, and address the service path, but leverage NSH for metadata.

Thus, in one form, a method is provided comprising: at a controller that is in communication with a plurality of network nodes which have one or more service functions associated therewith, establishing a service path for a service chain defined by an ordered sequence of service functions to be performed at respective ones of one or more of the plurality of network nodes, wherein one or more of the network nodes of the service path are capable of decapsulating packets of traffic to extract a network service header including service chain forwarding information instructing how packets are to be forwarded through the service chain and contextual service path information for the service chain forwarding information, and one or more of the network nodes of the service path are not capable of decapsulating packets to extract the network service header; and at the controller, assigning a predetermined service path identifier and a predetermined service index value for a segment of the service chain that includes only one or more network nodes not capable of decapsulating packets to extract the network service header so as to designate the one or more network nodes determined not capable of decapsulating packets to extract the network service header as a single service hop segment in the service chain.

In another form, an apparatus is provided comprising a network interface unit that sends and receives network communications over a network; and a processor coupled to the network interface unit, that: establishes a service path for a service chain defined by an ordered sequence of service functions to be performed at respective ones of one or more of a plurality of network nodes, wherein one or more of the network nodes of the service path are capable of decapsulating packets of traffic to extract a network service header including service chain forwarding information instructing how packets are to be forwarded through the service chain and contextual service path information for the service chain forwarding information, and one or more of the network nodes of the service path are not capable of decapsulating packets to extract the network service header; and assigns a predetermined service path identifier and a predetermined service index value for a segment of the service chain that includes only one or more network nodes not capable of decapsulating packets to extract the network service header so as to designate the one or more network nodes determined not capable of decapsulating packets to extract the network service header as a single service hop segment in the service chain.

In still another form, one or more non-transitory computer readable storage media are provided encoded with instructions that, when executed by a processor, cause the processor perform operations comprising: at a controller that is in communication with a plurality of network nodes which have one or more service functions associated therewith, establishing a service path for a service chain defined by an ordered sequence of service functions to be performed at respective ones of one or more of the plurality of network nodes, wherein one or more of the network nodes of the service path are capable of decapsulating packets of traffic to extract a network service header including service chain forwarding information instructing how packets are to be forwarded through the service chain and contextual service path information for the service chain forwarding information, and one or more of the network nodes of the service path are not capable of decapsulating packets to extract the network service header; and at the controller, assigning a predetermined service path identifier and a predetermined service index value for a segment of the service chain that includes only one or more network nodes not capable of decapsulating packets to extract the network service header so as to designate the one or more network nodes determined not capable of decapsulating packets to extract the network service header as a single service hop segment in the service chain.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    at a controller that is in communication with a plurality of network nodes, wherein each of the plurality of network nodes is associated with one or more service functions;
        establishing a service path for a service chain defined by an ordered sequence of one or more service functions to be performed at respective ones of one or more of the plurality of network nodes associated with the one or more service functions, wherein the service chain comprises one or more service segments that include one or more of the network nodes of the service path capable of decapsulating packets of traffic to extract a network service header including service chain forwarding information instructing how packets are to be forwarded through the service chain and contextual service path information for the service chain forwarding information, and one or more service segments that include one or more of the network nodes of the service path not capable of decapsulating packets to extract the network service header; and
        assigning a predetermined service path identifier and a predetermined service index value to the one or more service segments that include one or more of the network nodes of the service path not capable of decapsulating packets to extract the network service header so as to designate each of the one or more service segments that include one or more of the network nodes of the service path not capable of decapsulating packets to extract the network service header as a single hop service segment in the service chain.

2. The method of claim 1, wherein assigning comprises assigning separate service path identifiers and service index values to each service segment of the service chain.

3. The method of claim 2, wherein each service segment includes one or more of the network nodes capable of decapsulating packets to extract the network service header.

4. The method of claim 2, further comprising sending from the controller to each network node in the service chain the service path identifier and service index value relevant to the corresponding service segment of the service chain.

5. The method of claim 2, wherein the service path identifier is set to a value assigned by the controller for each of the one or more service segments that include one or more of the network nodes of the service path capable of decapsulating packets of traffic to extract a network service header.

6. The method of claim 2, wherein the predetermined service path identifier is set to a predetermined reserved value for each service segment that includes one or more of the network nodes of the service path not capable of decapsulating packets to extract the network service header.

7. The method of claim 6, wherein the predetermined service index value is 1 for each service segment that includes one or more of the network nodes of the service path not capable of decapsulating packets to extract the network service header.

8. The method of claim 2, wherein the service index value for each service segment of the service chain that includes one or more of the network nodes capable of decapsulating packets to extract the network service header is dependent on a number of network nodes in the segment.

9. The method of claim 1, further comprising detecting at the controller the one or more network nodes that are not capable of decapsulating packets to extract the network service header.

10. The method of claim 1, wherein the plurality of network nodes are physical or virtual network elements.

11. An apparatus comprising:
    a network interface unit that sends and receives network communications over a network; and
    a processor coupled to the network interface unit, that:
        establishes a service path for a service chain defined by an ordered sequence of one or more service functions to be performed at respective ones of one or more of a plurality of network nodes associated with the one or more service functions, wherein the service chain comprises one or more service segments that include one or more of the network nodes of the service path capable of decapsulating packets of traffic to extract a network service header including service chain forwarding information instructing how packets are to be forwarded through the service chain and contextual service path information for the service chain forwarding information, and one or more service segments that include one or more of the network nodes of the service path not capable of decapsulating packets to extract the network service header; and assigns a predetermined service path identifier and a predetermined service index value to the one or more service segments that include one or more of the network nodes of the service path not capable of decapsulating packets to extract the network service header so as to designate each of the one or more service segments that include one or more of the network nodes not capable of decapsulating packets to extract the network service header as a single hop service segment in the service chain.

12. The apparatus of claim 11, wherein the processor assigns separate service path identifiers and service index values to each service segment of the service chain.

13. The apparatus of claim 12, wherein each service segment includes one or more network nodes capable of decapsulating packets to extract the network service header.

14. The apparatus of claim 12, wherein the processor causes to be sent to each network node in the service chain the service path identifier and service index value relevant to the corresponding service segment of the service chain.

15. The apparatus of claim 12, wherein the processor sets the service path identifier to a value for each of the one or more service segments that include one or more of the network nodes of the service path capable of decapsulating packets to extract the network service header information.

16. The apparatus of claim 12, wherein the predetermined service path identifier is set to a predetermined reserved value for each of the one or more service segments that includes one or more of the network nodes not capable of decapsulating packets to extract the network service header.

17. The apparatus of claim 16, wherein the predetermined service index value is 1 for each of the one or more service segments that includes one or more of the network nodes not capable of decapsulating packets to extract the network service header.

18. The apparatus of claim 12, wherein the service index value for each of the one or more service segments that include one or more of the network nodes capable of decapsulating packets to extract the network service header is dependent on a number of network nodes in the service segment.

19. The apparatus of claim 11, wherein the processor detects the one or more network nodes that are not capable of decapsulating packets to extract the network service header.

20. One or more non-transitory computer readable storage media encoded with instructions that, when executed by a processor, cause the processor perform operations comprising:

at a controller that is in communication with a plurality of network nodes, wherein each of the plurality of network nodes is associated with one or more service functions;

establishing a service path for a service chain defined by an ordered sequence of one or more service functions to be performed at respective ones of one or more of the plurality of network nodes associated with the one or more service functions, wherein the service chain comprises one or more service segments that include one or more of the network nodes of the service path capable of decapsulating packets of traffic to extract a network service header including service chain forwarding information instructing how packets are to be forwarded through the service chain and contextual service path information for the service chain forwarding information, and one or more service segments that include one or more of the network nodes of the service path not capable of decapsulating packets to extract the network service header; and assigning a predetermined service path identifier and a predetermined service index value for the one or more service segments that include one or more of the network nodes not capable of decapsulating packets to extract the network service header so as to designate the one or more service segments that include one or more of the network nodes not capable of decapsulating packets to extract the network service header as a single hop service segment in the service chain.

21. The non-transitory computer readable storage media of claim 20, wherein the instructions operable to cause the processor to perform the operation of assigning comprise instructions operable to assign separate service path identifiers and service index values to each service segment of the service chain.

22. The non-transitory computer readable storage media of claim 21, further comprising instructions that cause the processor to send to each network node in the service chain the service path identifier and service index value relevant to the corresponding service segment of the service chain.

23. The non-transitory computer readable storage media of claim 21, wherein the predetermined service path identifier is set to a predetermined reserved value for each of the one or more service segments that include one or more of the network nodes not capable of decapsulating packets to extract the network service header.

24. The non-transitory computer readable storage media of claim 23, wherein the predetermined service index value is 1 for each of the one or more service segments that include one or more of the network nodes not capable of decapsulating packets to extract the network service header.

25. The non-transitory computer readable storage media of claim 21, wherein the service index value for each of the one or more service segments that include one or more of the network nodes capable of decapsulating packets to extract the network service header is dependent on a number of network nodes in the service segment.

26. The non-transitory computer readable storage media of claim 20, further comprising instructions operable to cause the processor to detect the one or more network nodes that are not capable of decapsulating packets to extract the network service header.

* * * * *